Jan. 31, 1967    JAMES E. WEBB    3,301,511
ADMINISTRATOR OF THE NATIONAL AERONAUTICS
AND SPACE ADMINISTRATION
WING DEPLOYMENT METHOD AND APPARATUS
Filed Jan. 28, 1965    3 Sheets-Sheet 1
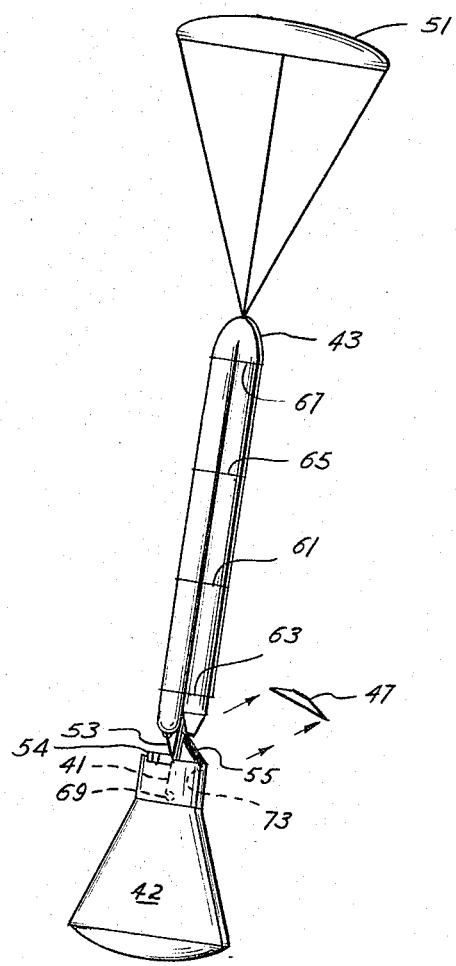
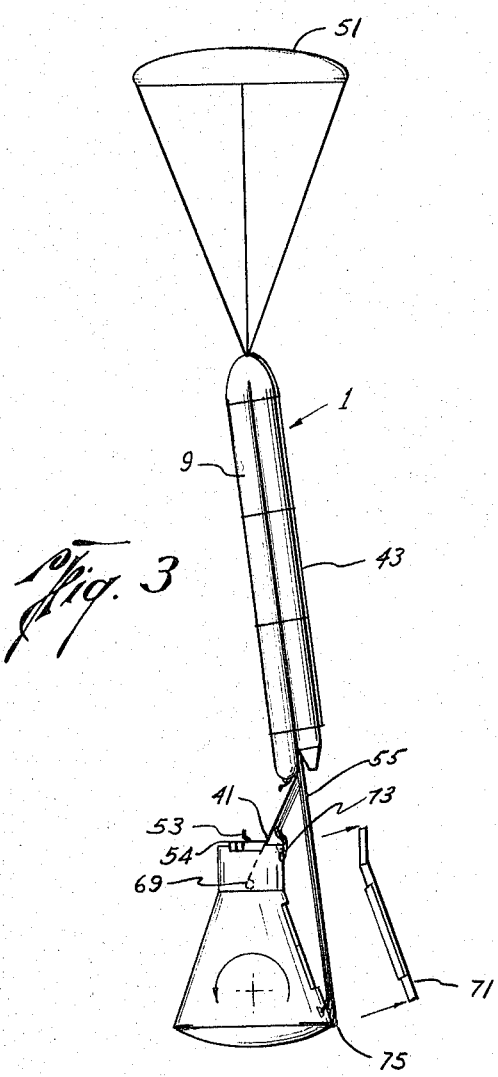
John Dale Sutliff
INVENTOR.
BY
ATTORNEYS

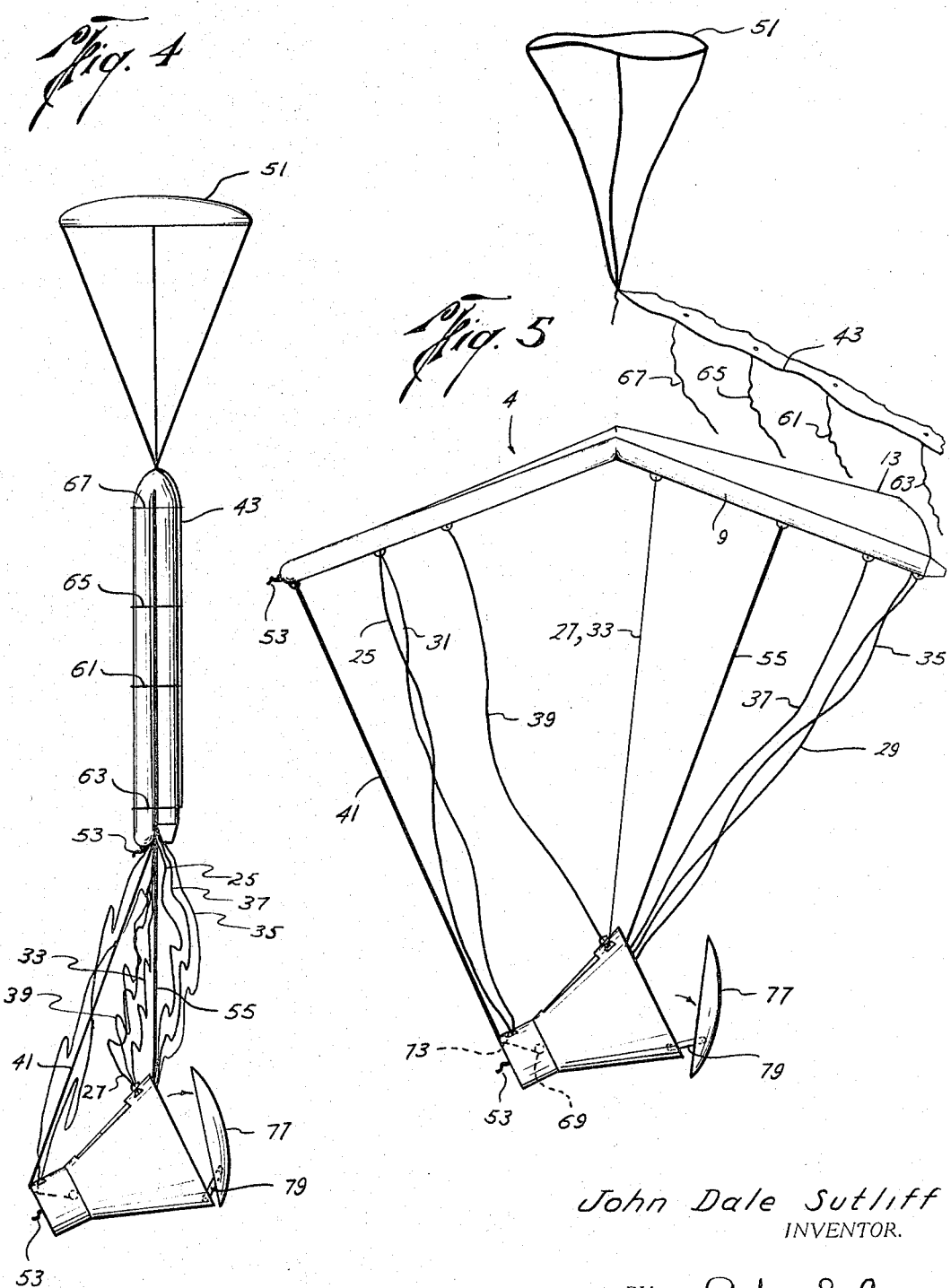

Jan. 31, 1967     JAMES E. WEBB     3,301,511
ADMINISTRATOR OF THE NATIONAL AERONAUTICS
AND SPACE ADMINISTRATION
WING DEPLOYMENT METHOD AND APPARATUS
Filed Jan. 28, 1965     3 Sheets-Sheet 3

John Dale Sutliff
INVENTOR.

BY
ATTORNEYS

United States Patent Office 3,301,511
Patented Jan. 31, 1967

3,301,511
WING DEPLOYMENT METHOD AND APPARATUS
James E. Webb, Administrator of the National Aeronautics and Space Administration with respect to an invention of John Dale Sutliff
Filed Jan. 28, 1965, Ser. No. 428,890
12 Claims. (Cl. 244—138)

This invention relates to flexible wing gliders and, more particularly, to an improved deployment method therefor.

The successful exploration of outer space necessitates an effective and reliable system for recovering the space vehicle after it has returned to the earth's atmosphere. Although the parachute served in this capacity satisfactorily during initial orbital flights conducted by this country, such a recovery system has distinct and inherent disadvantages. These disadvantages, which are exemplified by its lack of directional control, inability to achieve with reasonable accuracy a predetermined, limited landing area, and high impact loads upon landing, are greatly reduced by an alternative recovery system such as the flexible wing glider.

Although the flexible wing glider possesses certain of the features of the parachute such as compactness and lightness while minimizing its disadvantages, deployment of it is distinctly more complex. This is due in part to the high velocities at which deployment takes place and to the proportionate deployment forces which the wing must bear as a result thereof. In order to successfully deploy the wing, the kinetic energy of the vehicle must be reduced through a series of deployment steps, each of which transmits only a portion of the forces to the recovery system. In this manner the full aerodynamic configuration of the wing may be achieved without endangering the structural integrity or control functions of the system.

The subject invention is therefore directed to an improved deployment method in which the wing is pulled from its housing by a pilot chute and then sequentially and progressively opened in a controlled and predetermined series of steps until full aerodynamic form is reached, each step occurring with a minimal amount of impact and loading on the system. Additionally, the method includes means orienting the spacecraft beneath the wing before its full aerodynamic form is reached so as to achieve an optimal guidance and control position immediately upon full deployment. It should be recognized that this latter feature is particularly desirable if the load is a manned space vehicle, since it would inherently enhance the probability of landing the space vehicle without mishap to the occupants or damage to the vehicle. Still additional features and advantages of this deployment method will be revealed in the following detailed specification, claims, and drawings, wherein like numerals denote like parts in the several views and wherein:

FIG. 1 illustrates an exemplary space vehicle falling towards earth immediately prior to the initial deployment step.

FIGS. 2–5 illustrate the basic sequence of steps which occur during deployment of the flexible wing glider, in accordance with the subject invention.

Figure 6:
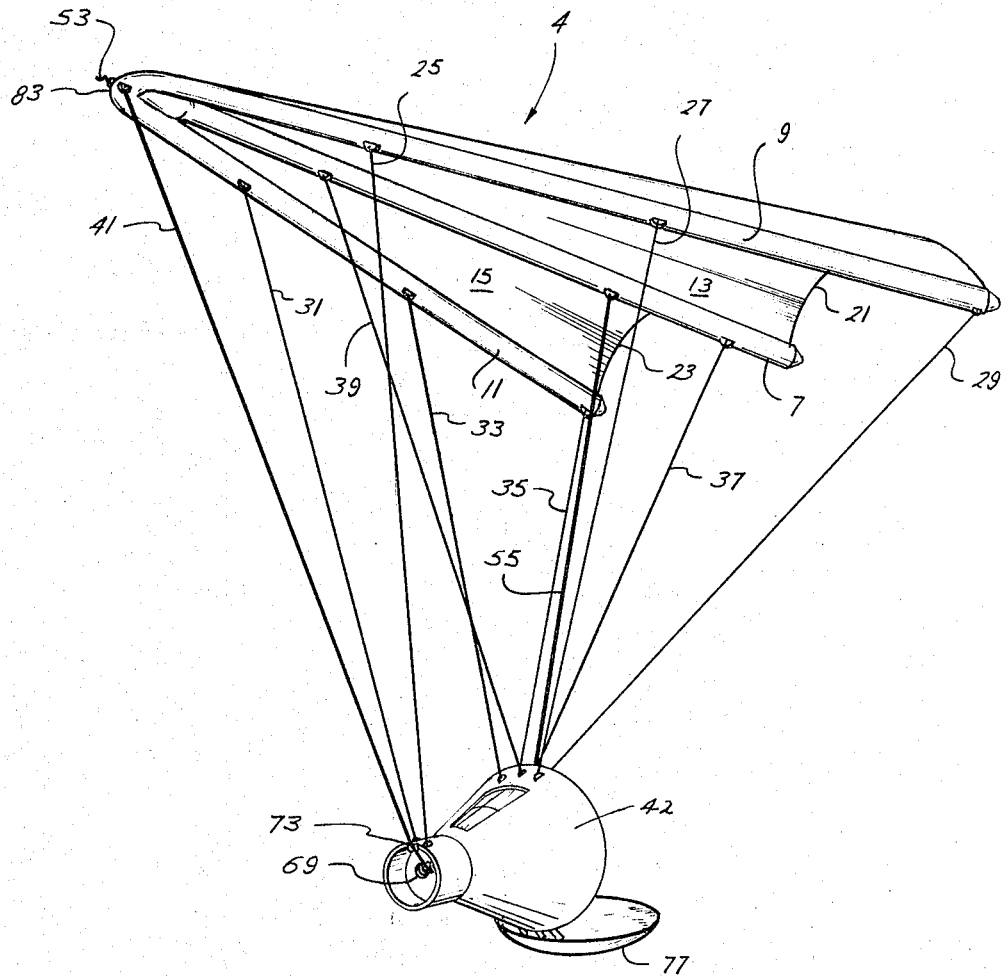
FIG. 6 illustrates the glider in fully deployed configuration.

The flexible wing, generally indicated at 4 and best shown in FIG. 6, is essentially an aircraft which is triangular in plan view. Its structural portions consist of a central inflatable longitudinal keel member 7 extending between a pair of inflatable leading edge members 9, 11 joined to the forward end of central keel 7. Extending between the keel and leading edge members is a flexible or pliable membrane having sections 13, 15 which comprise the lifting surface for the vehicle. The membrane is unsupported at its rear edges 21, 23 and, therefore, tends to balloon upwardly on either side of the keel member and the leading edge members, thus developing significant aerodynamic lift capabilities when compared to its total structural weight.

Although the membrane is impervious to air and strong enough to withstand initial impact loads upon deployment, it must be fully flexible so as to be compactly foldable within its storage compartment in the vehicle. Various woven fabrics sealed or coated with a plastic material, such as polyester Dacron, have been found to be suitable for this purpose. The membrane is connected to the keel member and the edge members in a permanent manner as by binding or stitching. Edge suspension lines 25, 27, 29, 31, 33, and 35 keel suspension lines 37, 39, and restraining lines 41, 55 are connected to the load thereunder beneath in a manner described hereinafter. The suspension lines 29, 35, and 37 serve also as control lines. A compressed gas source is enclosed within the keel and in each leading edge member so as to inflate it and the edge members, either automatically or by remote control, at the appropriate time.

The wing, along with the various suspension lines, is contained within the spacecraft or other load 42 in a predetermined folded manner like that of a parachute pack. The actual folded form will depend to some extent on the wing size, the size of the load, the available space, and the deployment sequence. As shown best in FIG. 2, the wing is enclosed in a tubular sleeve or cover 43 of flexible material to which is connected a pilot or drag chute 51 of relatively small size. The entire packed assembly is enclosed within the vehicle 42 by a cover 47.

As noted above, the load is shown for exemplary purposes as a space vehicle 42 which is to be landed safely after returning to the earth's atmosphere. Therefore, in FIG. 1, it is seen that the space vehicle is in the same relative position as may be expected upon re-entry into the earth's atmosphere, that is, falling with heat shield 77 directed downwardly to dissipate the heat generated as the vehicle moves through the increasingly denser atmosphere. At the appropriate altitude, the cover 47 is jettisoned from the nose end by manual or automatic means such as a barostat actuator. The surrounding slip stream extracts the pilot chute 51 which immediately opens and exerts a drag on the folded and packed wing which is pulled from the vehicle as a result thereof. During and immediately after chute 51 pulls the wing from the space vehicle, it is inflated by means of automatically actuated cartridges of compressed gas carried within the keel or edge members. The inflated wing adds additional drag forces to that created initially by chute 51 as it instantly deploys to a folded trailing position behind the vehicle as illustrated in FIG. 2. The distance of the wing behind the vehicle is determined by restraining cables 53, 55 which are connected thereto to structural members within the vehicle. The cables 53, 55 serve primarily to absorb a portion of the kinetic energy of the spacecraft when the wing is pulled therefrom by drag chute 51, thereby significantly lowering the final deployment shock which occurs when packing lines 61, 63, 65, and 67 are removed.

As the wing trails in the folded position, the vehicle is moved into a flying and landing orientation. This is accomplished by means of a reel and clutch mechanism generally indicated at 69 and described below. As the wing trails the vehicle in the position generally indicated in FIGS. 2 and 3, the fore restraining cable 53 is severed such as by a reefing cutter or an automatic pyrotechnic device 54 and the tensile load, which it bore, is taken up by reel line 41 connected to the clutch and reel mechanism 69. The tensile force in the reel line actuates the clutch mechanism, which thus unwinds the line at a preset rate, thereby causing the end of the space vehicle nearest the wing to rotate counterclockwise. At approximately the same time a fairing or cover member 71 attached at the side of the space vehicle and covering the cable 55 is jettisoned. Removal of the fairing shifts the pivot point of the aft cable 55 from a first pivot position on the spacecraft indicated at 73 to the point 75 on the heat shield side of the vehicle as shown in FIG. 3. The shift of the attachment point induces a counterclockwise moment about the space vehicle center of gravity which additionally assists in the rotation of it. The reel line 41 continues to unwind until the space vehicle reaches a position in which its nose end is tilted slightly below the horizontal. The heat shield 77, as shown in FIG. 4, then opens and pivots slightly on member 79 to allow aft restraining cable 55 to extend in an unobstructed manner from the back vehicle to the wing. The various control lines 29, 37, 35 trailing the space vehicle are in slack condition at this point.

With reference to FIGS. 4 and 5, it is seen that when the space vehicle reaches its final position, that is, the desired orientation with respect to the wing, the packing lines 61, 63, 65, and 67 are severed, thus allowing protective cover 43 to be stripped from the wing as a result of the drag forces exerted by the chute 51 to which it is attached. The chute and cover 43 are thus jettisoned from the system. The severing of these lines may also be caused by reefing cutters, automatically actuated pyrotechnic devices, or other appropriate means. As this occurs the inflated wing unfolds from its overlapped U-shape and immediately extends to the full aerodynamic form. This step, as shown in FIG. 5, causes the slack remaining in the suspension lines to be taken up thus allowing them to assume the full load of the vehicle therebeneath. The rear suspension lines 29, 37, and 35 then extend into the heat shield end of the vehicle in an unobstructed manner due to the partially rotated position of the shield. These lines may be operatively connected to a control arm or other appropriate mechanism (not shown) in the vehicle which allows the pilot to exercise control over the wing by raising or lowering the leading edges of the deployed wing, thereby altering its angle of attack or turn rate.

The entire system, that is, both space vehicle and wing, will descend until, at some point prior to landing, the heat shield 77 is rotated to the fully opened position shown in FIG. 6 where it may act as a landing skid for reducing landing shock.

In summary it may therefore be noted that the deployment sequence of the subject invention occurs in three major steps. The flexible wing is first removed from the stored area in the space vehicle by means of a drag chute. The loading forces, which occur during this initial step, are absorbed by fore and aft restraining cables attached to the vehicle and which thereafter, through their coaction, subsequently rotate the vehicle to an optimal flying and control position with respect to the wing. When this has been completed, the protective covering on the wing is stripped therefrom and the fore cable is severed thus allowing final deployment loads to be absorbed by a plurality of suspension lines. The sequence of deployment operation may be timed to suit various applications, but can feasibly be completed in less than five seconds at low altitudes.

It is thus seen that the primary function of the fore cable is to absorb the initial deployment shock which occurs when the wing is removed from its compartment in the space vehicle. The subsequent extension of this cable reduces the kinetic energy which the suspension lines must absorb when final deployment occurs.

In employing modifications of this concept, various approaches may be used, that which is preferable depending upon factors such as payload, glider size, altitude, speed, and the like. Thus, instead of severing the fore cable immediately after extraction, it may be connected to the reel and clutch mechanism directly. After the glider has extracted, the vehicle may be oriented and the fore cable fully extended, before it is severed, to allow final deployment loading to be carried by the suspension lines when the packing cover 43 is jettisoned.

In still another alternative deployment sequence, the fore restraining line may not be severed, but may instead be extensible to the full deployment position of the wing where it is attached to nose end 83. It is found to be preferable, however, to utilize the fore cable only as a restraining device, which absorbs the major portion of the deployment loads, and which is thereafter severed to permit final deployment loads to be exerted on the suspension lines as previously described.

It may be recognized that the system described above is applicable not only for returning a vehicle from outer space but may also be applied for other purposes, such as dropping cargo from an aircraft or for recovering initial stages of space booster vehicles, so as to avoid destruction thereof.

It should further be understood that minor variations can be made from the form of invention disclosed herein without departing from the spirit and scope thereof, and that the specification, drawings, and following claims are to be considered as illustrative of the concept disclosed herein.

Therefore, what is claimed and desired to be secured by Letters Patent is:

1. A method for deploying a folded, flexible wing glider connected to an airborne body by a plurality of suspension cord means and restraining cord means, comprising the steps of:

releasing the folded glider from the body to a first folded trailing position dictated by the length of said restraining cord means; and severing one only of said restraining cord means to permit the surrounding slip stream to fully deploy said glider at a second position farther from said vehicle than said first position whereby the forces incurred during full deployment thereof are borne by said plurality of suspension cords.

2. A method of deploying a folded, inflatable glider packed within a flying vehicle and connected thereto by restraining and suspension cord means, comprising the steps of:

inflating and simultaneously releasing the folded wing from the flying vehicle so that it assumes a folded, first trailing position at a distance from the vehicle dictated by said restraining cord means; and severing one of said restraining cord means, thereby allowing the surrounding slip stream to deploy said glider to full aerodynamic configuration at a second position farther from said vehicle than said first position, the distance of said second position from said vehicle being determined by the length of said suspension cord means.

3. A method for deploying a folded, flexible wing glider enclosed in a space vehicle and connected thereto by a plurality of suspension and restraining cord means, comprising the steps of:

opening said vehicle and thereby allowing a pilot chute connected to said glider to be extracted from the vehicle into the surrounding slip stream;

said pilot chute deploying in the slip stream so as to create a dragging force on the glider;

said glider being extracted from the vehicle to a folded trailing undeployed position immediately behind the vehicle at a proximate distance therefrom dictated by the length of said restraining cord means; and severing one only of said restraining cord means and fully deploying the glider at a second position greater than said first proximate distance, the distance of said second position from said vehicle dictated by said suspension cord means.

4. A method of deploying a folded, inflatable, flexible wing glider packed within a flying vehicle and connected thereto by a plurality of suspension and restraining cord means, comprising the steps of:
  inflating and simultaneously releasing the folded wing from the flying vehicle so that it assumes a folded, trailing position at a distance therefrom dictated by the length of said restraining cord means;
  severing one of said restraining cord means so as to transfer the load thereon to certain of said suspension cord means having a length substantially the same as said restraining cord means;
  extending the length of said one suspension cord means to thereby orient the vehicle with respect to the glider; and
  automatically releasing the trailing wing from its folded form, thus allowing final deployment loads to be absorbed by a plurality of suspension cord means.

5. A method of deploying a folded, inflatable, flexible wing glider packed within a flying vehicle and connected thereto by a plurality of suspension and restraining cord means, comprising the steps of:
  inflating and simultaneously releasing the folded wing from the flying vehicle so that it assumes a folded, trailing position at a distance therefrom dictated by the length of said restraining cord means;
  severing one of said restraining cord means and thereby transferring the tensile forces therein to certain of said suspension cord means, the length of which is substantially the same as said restraining cord means when severed;
  extending the length of said certain suspension cord means to thereby orient the vehicle and reduce final deployment loads on the remaining suspension cord means; and
  automatically releasing the folded wing from its trailing folded form to thus allow it to become fully deployed.

6. The method of deploying a covered, inflatable, flexible wing glider packed within a falling body and connected thereto by a plurality of restraining and suspension cord means, comprising the steps of:
  causing the folded wing to be extracted from said body by deploying a drag chute connected to it into the slip stream of air thereabout;
  inflating the wing while retaining it in partially folded form by said cover means as it is extracted from the body;
  absorbing the decelerating forces caused by the initial removal of the folded wing from the body by means of said restraining cord means;
  severing certain of the restraining cord means and transferring the tensile forces therein to said suspension cord means;
  extending said suspension cord means so as to orient the body beneath the wing to a desired position; and
  jettisoning said cover means, thus allowing the slip stream to unfold the wing to a fully deployed configuration at which time the decelerating forces caused thereby are borne by said plurality of suspension cord means.

7. The method of deploying an inflatable wing folded within and connected to a space vehicle by a plurality of suspension and restraining cord means, comprising the steps of:
  extracting the wing from the vehicle in a partially deployed form and absorbing decelerating forces caused thereby by a pair of said restraining cord means;
  extending said restraining cord means to induce movement of the vehicle to a desired orientation with respect to the wing;
  transferring substantially all the tensile load on said restraining cord means to a plurality of said suspension means by severance of one of said restraining cord means so that upon final deployment of the wing the decelerating forces caused thereby are borne by said plurality of suspension means; and
  controlling the flying characteristics of said wing by manipulation of said suspension means from said vehicle.

8. The method of deploying an inflatable wing folded within and connected to a space vehicle by a plurality of suspension and restraining cord means, comprising the steps of:
  deploying a drag chute connected to the wing which thereby extracts the wing from the vehicle in order to decelerate the velocity of said vehicle;
  the kinetic energy of the vehicle being borne by a pair of restraining cord means connected from the wing to the vehicle;
  severing one of said restraining cord means and transferring the load thereon to an extensible cord means;
  extending said extensible cord means and also the remaining restraining cord means in a manner causing desired orientation of the vehicle with respect to the wing; and
  deploying said wing to its final aerodynamic configuration at which the deceleration forces caused thereby are borne by a plurality of suspension means.

9. A method of deploying a covered, flexible wing glider which is packed within a freely falling spacecraft and connected to it by a plurality of restraining and suspension cord means, comprising the steps of:
  deploying a drag chute into the slip stream behind the spacecraft which pulls the folded and covered wing therefrom;
  inflating the folded glider as it is pulled from the spacecraft so that it assumes a folded, trailing position at a distance therefrom dictated by the length of said restraining cord means to thereby reduce the kinetic energy of said spacecraft;
  orienting said spacecraft to a predetermined position with respect to the glider by extending the length of the restraining cord means;
  jettisoning the glider cover and simultaneously severing one of said restraining cord means to thereby transfer the load thereon to the plurality of suspension cord means so as to distribute the deceleration loads occurring as the glider deploys to full aerodynamic configuration;
  controlling and guiding said glider to a landing by manipulation of said suspension cord from within the spacecraft.

10. A method of deploying a folded, inflatable, flexible wing glider packed within a freely falling body and connected thereto by a plurality of suspension cord means and by fore and aft restraining cord means, comprising the steps of:
  inflating and simultaneously releasing the glider from the falling body whereby it assumes a folded trailing position at a distance proximate to said body which is dictated by the length of said fore and aft restraining cord means;
  transferring part of the load from said restrainng cord means to said suspension cord means by severing said fore restraining cord means;
  simultaneously extending certain of said suspension cord means and said aft restrainng cord means, the latter extending at a rate faster than the former to thereby induce rotation of said body to a desired attitude with respect to the glider; and
  automatically releasing the trailing glider from its folded form to assume an aerodynamic configuration and thus allow final deployment loads to be borne by the plurality of suspension cord means.

11. A payload having a flexible wing glider and deployment means disposed therewithin for bringing said payload to a controlled landing on a landing surface, said glider and deployment means comprising:
- a foldable, flexible wing substantially triangular in plan view and having inflatable leading edge members and an inflatable, central longitudinal keel member;
- a plurality of restraining and suspension lines, each attached at one end to said inflatable members and at their other end to said payload;
- certain of said restraining lines being of shorter length than said suspension lines;
- means for transferring the loads on said shorter lines to the remaining suspension lines by severance of the shorter lines after the glider begins final deployment; and
- means for deploying said glider so that decelerating loads caused by deployment are initially borne by said short restraining lines and subsequent decelerating loads are borne by the remainng suspension lines.

12. A payload having a flexible wing glider and deployment means therefor disposed within said payload for bringing it to a controlled landing, said glider and deployment means comprising:
- a foldable, flexible wing substantially triangular in plan view and having inflatable leading edge members and an inflatable, central, longitudinal keel member;
- a plurality of suspension lines including fore and aft restraining lines, each of said suspension lines connected at one end to said glider and at the other end to said payload;
- said fore and aft restraining lines being of shorter length than said other suspension lines;
- means for severing said fore restraining line and transferring the load thereon to certain of said suspension lines after said glider begins to fully deploy;
- means connected within the payload for extending certain of said suspension lines and said aft restraining line so as to orient the payload to a flying attitude with respect to the glider; and
- means for deploying said glider so that decelerating loads caused thereby are initially borne by said fore and aft restraining lines and subsequent decelerating loads are borne by the other of said suspension lines.

References Cited by the Examiner
UNITED STATES PATENTS

| 3,141,640 | 7/1964 | Sutliff et al. | 244—138 |
| 3,198,458 | 8/1965 | Fink | 244—49 |

OTHER REFERENCES

Aviation Week and Space Technology, May 13, 1963, pp. 57, 76, 81.

Flight International, August 1, 1963, p. 185.

References Cited by the Applicant
UNITED STATES PATENTS

| 1,556,502 | 10/1925 | Doucett. |
| 2,702,680 | 2/1955 | Heinemann et al. |
| 2,806,667 | 9/1957 | Kugler. |
| 3,054,584 | 9/1962 | Andras. |

MILTON BUCHLER, *Primary Examiner.*

ALFRED E. CORRIGAN, *Examiner.*